(12) United States Patent
Ho

(10) Patent No.: US 7,073,409 B2
(45) Date of Patent: Jul. 11, 2006

(54) PEDAL DEVICE

(76) Inventor: Hsiao-Chin Ho, 58, Ma Yuan West St., Taichung (TW)

( * ) Notice: Subject to any disclaimer, the term of this patent is extended or adjusted under 35 U.S.C. 154(b) by 432 days.

(21) Appl. No.: 10/444,728

(22) Filed: May 22, 2003

(65) Prior Publication Data

US 2004/0231454 A1    Nov. 25, 2004

(51) Int. Cl.
*B62M 3/08* (2006.01)
*G05G 1/14* (2006.01)

(52) U.S. Cl. .................................... 74/594.6
(58) Field of Classification Search ............. 74/594.6, 74/594.4; 36/131
See application file for complete search history.

(56) References Cited

U.S. PATENT DOCUMENTS

| | | | | |
|---|---|---|---|---|
| 4,947,708 A | * | 8/1990 | Lacombe | 74/594.6 |
| 5,060,537 A | * | 10/1991 | Nagano | 74/594.6 |
| 5,497,680 A | * | 3/1996 | Nagano | 74/594.6 |
| 5,848,560 A | * | 12/1998 | Lin | 74/594.6 |
| 6,170,357 B1 | * | 1/2001 | Chen | 74/594.6 |
| 6,230,584 B1 | * | 5/2001 | Lin | 74/594.6 |
| 6,244,136 B1 | * | 6/2001 | Chen | 74/594.6 |
| 6,393,940 B1 | * | 5/2002 | Ueda | 74/594.6 |
| 6,708,584 B1 | * | 3/2004 | Muraoka | 74/594.6 |
| 2004/0187636 A1 | * | 9/2004 | Hsiao et al. | 74/594.6 |

* cited by examiner

*Primary Examiner*—Chong H. Kim
(74) *Attorney, Agent, or Firm*—Alan D. Kamrath; Nikolai & Mersereau, P.A.

(57) ABSTRACT

A pedal device has a main body, a connection device, a pair of torsion springs, an adjustment seat, an adjustment stud, and a main shaft. The connection device has a chamber, an inner socket, and an upper hook portion. The adjustment seat has a cushion body, an adjustment stud inserted through the cushion body, and a hollow disk enclosing the adjustment stud. The main body has an opening and a recessed panel having a through aperture. The torsion springs are inserted in the connection device. Each torsion spring has a first end to block the inner socket and a second end to block the adjustment seat. The main shaft is inserted through the main body and the torsion springs. The connection device engages with the main body.

13 Claims, 17 Drawing Sheets

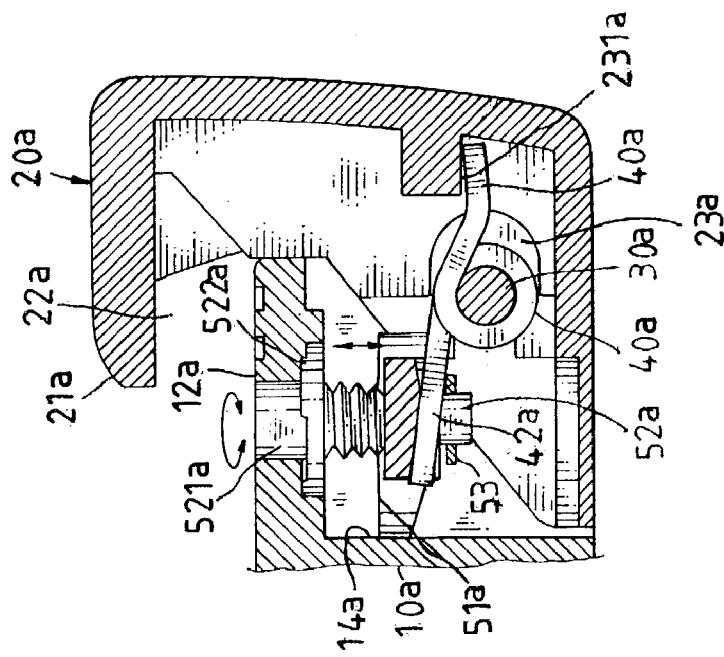
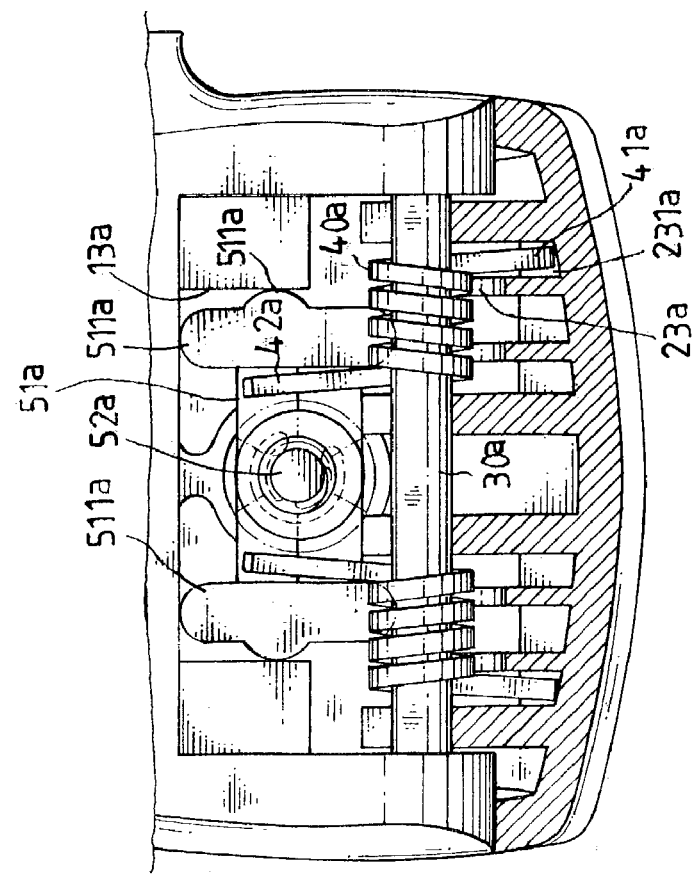
Fig. 11
Fig. 10

PEDAL DEVICE

BACKGROUND OF THE INVENTION

The present invention relates to a pedal device. More particularly, the present invention relates to a pedal device of a bicycle.

Referring to FIG. 1, a first conventional pedal device 100 has a plurality of elements therein (not shown in FIG. 1). Since the elements are not covered, the elements are easily dirty and rusted.

Referring to FIG. 2, a second conventional pedal device 80 has a main body 81, a rear connector 82, a pair of compression springs 83, an adjustment seat 84, an adjustment stud 85, and a positioning nut 86. The rear connector 82 has a chamber 821. The adjustment seat 84 has a center hole 841. The main body 81 has a lower groove 811 and a through aperture 812. The rear connector 82 engages with the main body 81. The compression springs 83 are disposed in the chamber 821 of the rear connector 82. The adjustment seat 84 are disposed on the compression springs 83. The positioning nut 86 is inserted in the center hole 841 of the adjustment seat 84. The adjustment stud 85 is inserted through the positioning nut 86. The adjustment stud 85 has a ring-shaped head 851 inserted in the through aperture 812 of the main body 81. The adjustment seat 84 is inserted in the lower groove 811 of the main body 81. Each of the compression springs 83 has a large elasticity fatigue. A long length of each compression spring 83 will provide a good recovering force, but a volume of each compression spring 83 will be increased so that a volume of the rear connector 82 should be increased in order to receive the compression springs 83.

Referring to FIG. 3, a third conventional pedal device 80' engages with an outsole clamp device 90'. The outsole clamp device 90' has a tongue-shaped body 91' and an oblong hole 911'. A rectangular antiskid device 92' has a periphery flange 921' engaging with the oblong hole 911' of the outsole clamp device 90'. The outsole clamp device 90' is disposed on a bottom of a runner shoe 100'. However, the rectangular antiskid device 92' is easily disengaged from the outsole clamp device 90'.

SUMMARY OF THE INVENTION

An object of the present invention is to provide a pedal device which has a pair of torsion springs inserted in the connection device and a main body engaging with the connection device in order to assemble the pedal device easily.

Another object of the present invention is to provide a pedal device which has an antiskid device having a pawl device and a base ring surrounding the pawl device so that the pawl device will engage with a plurality of inner protrusions of an outsole clamp device stably.

Accordingly, a pedal device comprises a main body, a connection device, a pair of torsion springs, an adjustment seat, an adjustment stud, and a main shaft. The connection device has a chamber and an upper hook portion. The adjustment seat has a cushion body and an adjustment stud inserted through the cushion body. The adjustment seat is disposed between the main body and the connection device. The main body has an opening. The torsion springs are inserted in the connection device. Each of the torsion springs has a first end to block the connection device and a second end to block the adjustment seat. The main shaft is inserted through the main body and the torsion springs. The connection device engages with the main body.

In accordance with a first preferred embodiment of the present invention, a pedal device comprises a main body, a connection device, a pair of torsion springs, an adjustment seat, an adjustment stud, and a main shaft. The connection device has a chamber, an inner socket, and an upper hook portion. The adjustment seat has a cushion body, an adjustment stud inserted through the cushion body, a hollow disk enclosing the adjustment stud, and a retainer enclosing an end of the adjustment stud to prevent the adjustment stud from being disengaged from the cushion body. The adjustment stud has a ring-shaped head. The cushion body has a pair of curved flanges. The main body has an opening and a recessed panel having a through aperture. The adjustment seat is disposed between the main body and the connection device. The torsion springs are inserted in the inner socket of the connection device. Each of the torsion springs has a first end to block the inner socket and a second end to block the adjustment seat. The main shaft is inserted through the main body and the torsion springs. The ring-shaped head of the adjustment stud is inserted in the through aperture of the recessed panel. The connection device engages with the main body.

In accordance with a second preferred embodiment of the present invention, a pedal device comprises a main body, a connection device, a pair of torsion springs, an adjustment seat, an adjustment stud, a main shaft, two threaded rings, and two cover plates. The connection device has an upper hook portion. The adjustment seat has a cushion body, an adjustment stud inserted through the cushion body, and a retainer enclosing an end of the adjustment stud. The adjustment stud has a ring-shaped head. The cushion body has a pair of curved flanges. The main body has an opening and a recessed panel having a through aperture. The torsion springs are inserted in the connection device. The main shaft has two end portions. The main shaft is inserted through the torsion springs and inserted in the connection device. The ring-shaped head of the adjustment stud is inserted in the through aperture of the recessed panel. The main body further has two lateral plates, two lateral recesses, two threaded apertures, two guide slots, and each of the threaded apertures communicating with the corresponding guide slot. Each end portion of the main shaft is inserted in the corresponding guide slot of the main body. Each threaded ring is inserted in the corresponding threaded aperture to be engaged with the corresponding end portion of the main shaft. Each cover plate is inserted in the corresponding lateral recess of the main body. The connection device engages with the main body.

In accordance with a third preferred embodiment of the present invention, a pedal device comprises a main body, a connection device, a pair of torsion springs, an adjustment seat, an adjustment stud, and a main shaft. The connection device has a chamber, an inner socket, and an upper hook portion. The adjustment seat has a cushion body, an adjustment stud inserted through the cushion body, a hollow disk enclosing the adjustment stud, and a retainer enclosing an end of the adjustment stud. The adjustment stud has a ring-shaped head. The cushion body has a pair of curved flanges and a lower bevel. The main body has an opening, an inner wall, and a recessed panel having a through aperture and a bottom groove. An L-shaped angle plate is disposed on a bottom of the recessed panel. The torsion springs are inserted in the inner socket of the connection device. Each of the torsion springs has a first end to block the inner socket and a second end to block the lower bevel of the cushion body. The ring-shaped head of the adjustment stud is inserted in the through aperture of the recessed panel. The hollow disk is inserted in the bottom groove of the recessed panel. The connection device engages with the main body. The main shaft is inserted through the main body and the torsion springs. The inner socket of the connection device has a notch to receive the first end of the corresponding torsion spring. The cushion body is blocked by the L-shaped angle plate and the inner wall of the main body.

In accordance with a fourth preferred embodiment of the present invention, a pedal device comprises a main body, a connection device, a pair of torsion springs, an adjustment seat, an adjustment stud, and a main shaft. The main body has an opening, an inner lug having a circular hole, and a recessed panel. The connection device has a chamber, an inner socket, an upper hook portion, and a semicircular groove. The adjustment seat has a cushion body disposed between the inner lug and the recessed panel, an adjustment bolt inserted through the inner lug and the cushion body, and a retainer enclosing an end of the adjustment bolt. The cushion body has a pair of curved flanges. The torsion springs are inserted in the inner socket of the connection device. Each of the torsion springs has a first end to block the inner socket and a second end to block the cushion body. The connection device engages with the main body. The main shaft is inserted through the main body and the torsion springs. An L-shaped angle plate is disposed on a bottom of the recessed panel. The L-shaped angle plate blocks the cushion body. The inner lug is inserted in the semicircular groove of the connection device.

In accordance with a fifth preferred embodiment of the present invention, a pedal device comprises a main body, a connection device, a pair of torsion springs, an adjustment seat, an adjustment stud, and a main shaft. The main body has an opening, a recessed panel, and an oblong hole. The connection device has a chamber, an inner socket, an upper hook portion, and a circular hole. The adjustment seat has a cushion body disposed on the connection device, an adjustment bolt inserted through the connection device and the cushion body, and a retainer enclosing an end of the adjustment bolt. The cushion body has a pair of curved flanges. The torsion springs are inserted in the inner socket of the connection device. Each of the torsion springs has a first end and a second end to block the main body. The connection device engages with the main body. The main shaft is inserted through the main body and the torsion springs. An L-shaped angle plate is disposed on a bottom of the recessed panel. The L-shaped angle plate blocks the cushion body.

BRIEF DESCRIPTION OF THE DRAWINGS

FIG. 10 is a first partially sectional view of a pedal device of a third preferred embodiment in accordance with the present invention;

FIG. 11 is a second partially sectional view of a pedal device of a third preferred embodiment in accordance with the present invention;

DETAILED DESCRIPTION OF THE INVENTION

Figure 1:
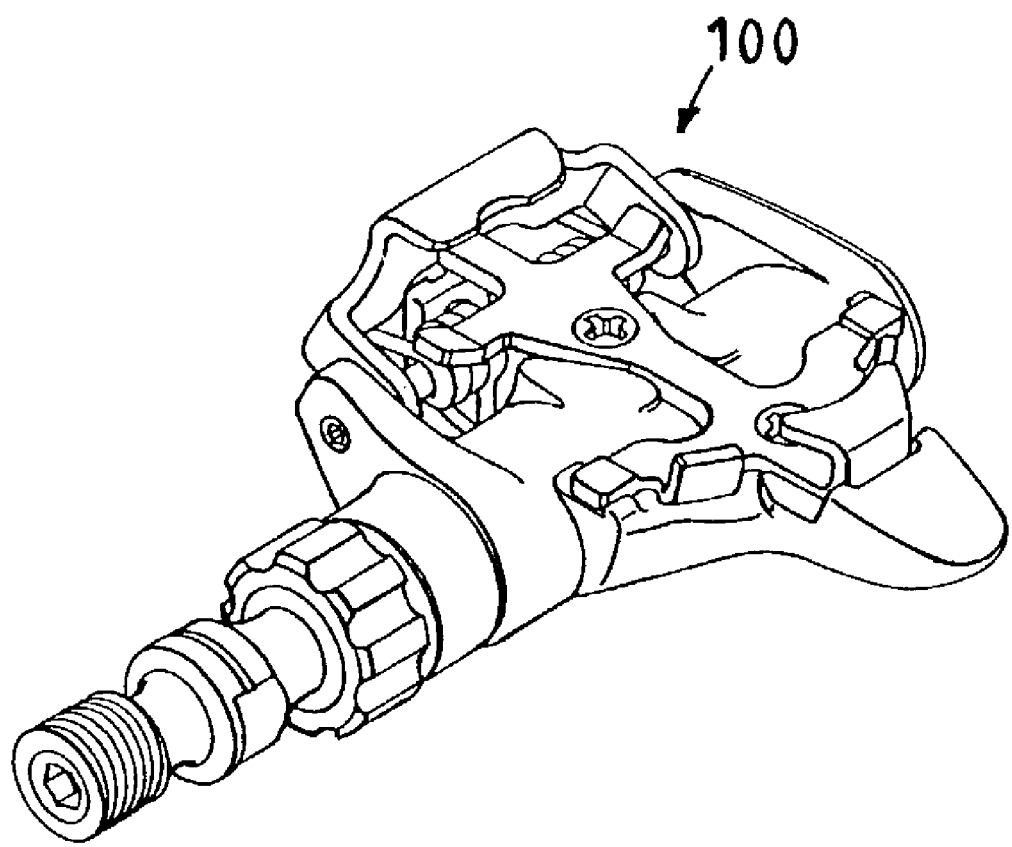
FIG. 1 is a perspective view of a conventional pedal device of a first prior art.
Figure 2:
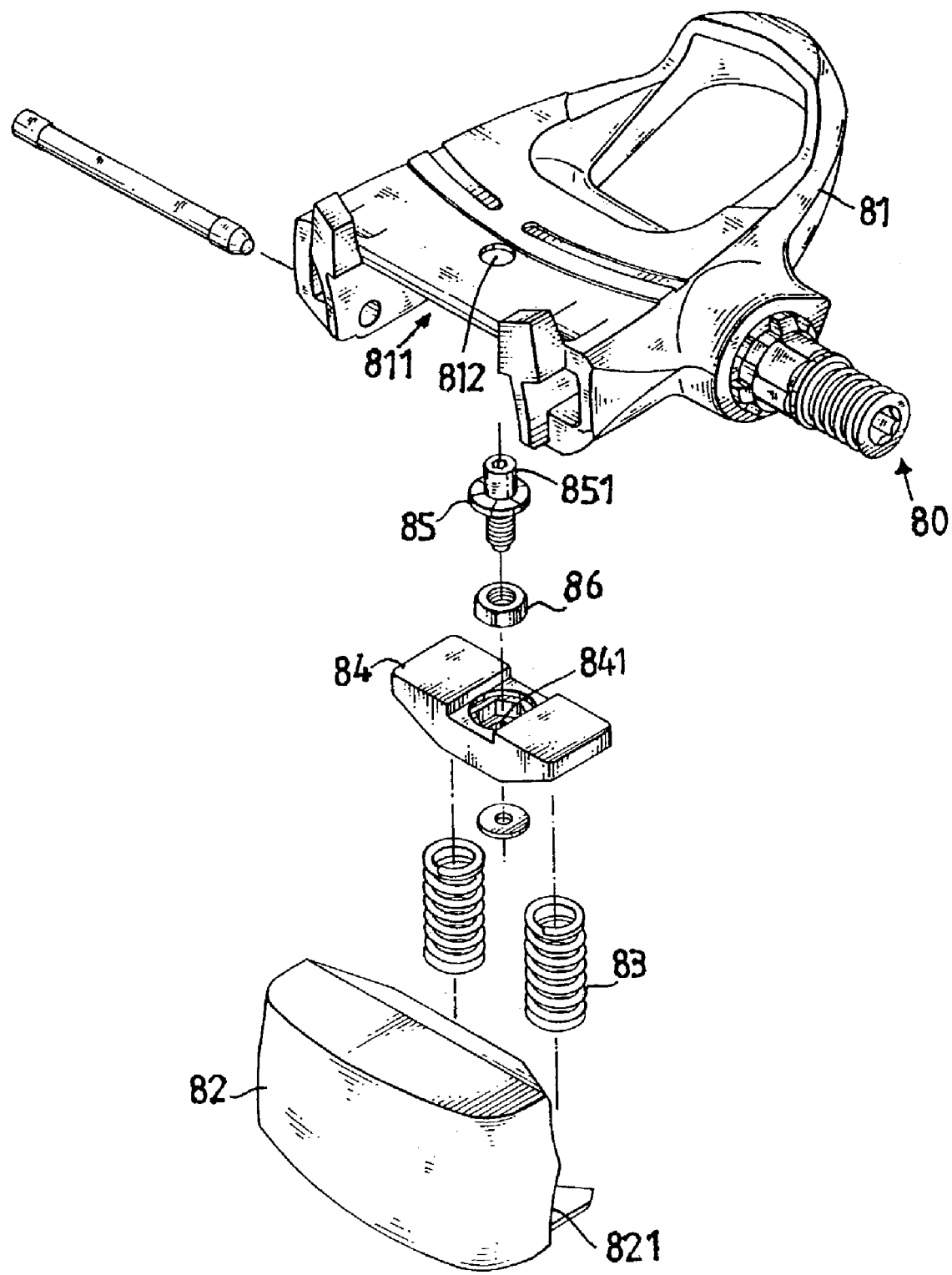
FIG. 2 is a perspective exploded view of a conventional pedal device of a second prior art.
Figure 3:
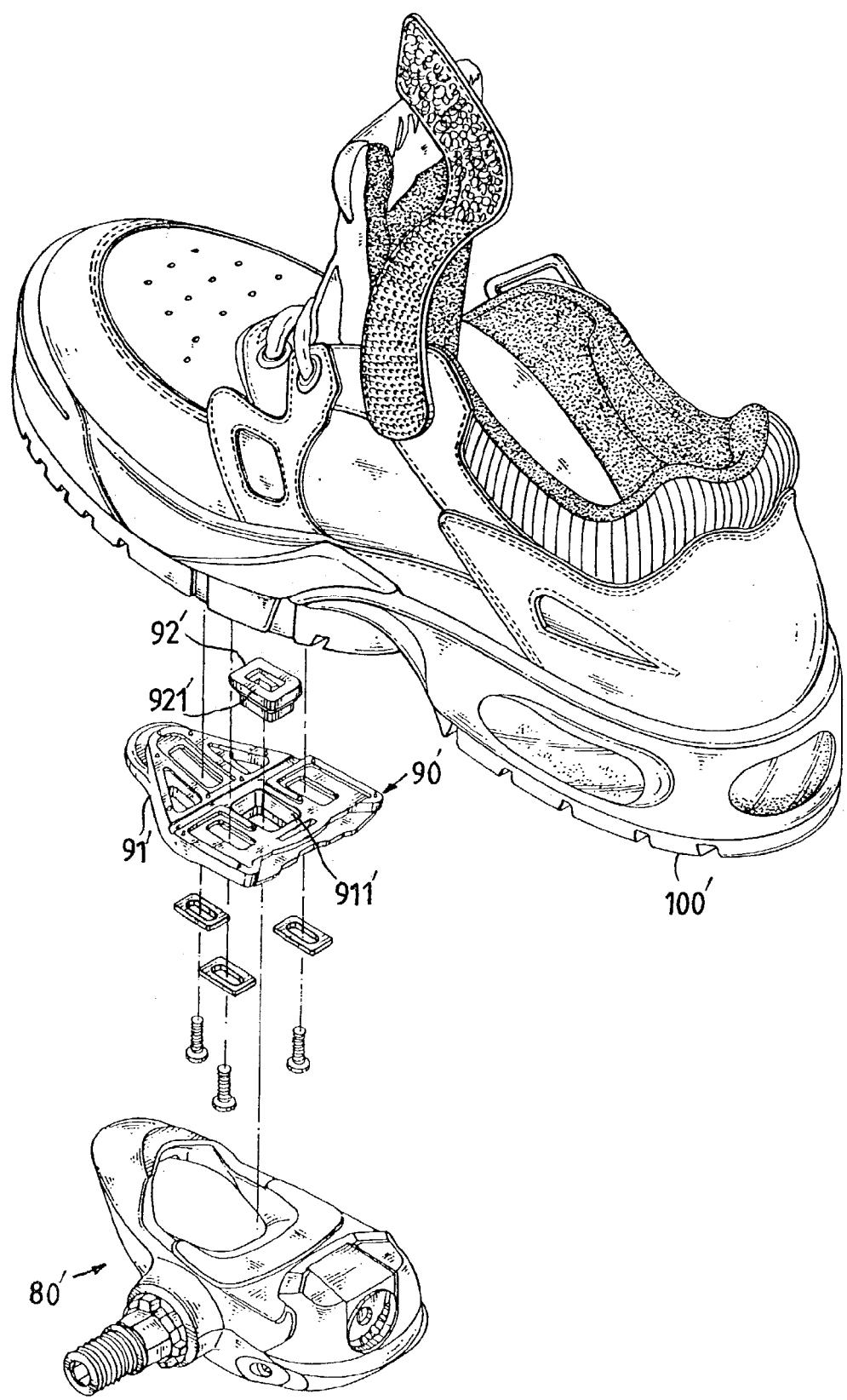
FIG. 3 is a perspective exploded view of a runner shoe, an outsole clamp device, and a conventional pedal device of a third prior art.
Figure 4:
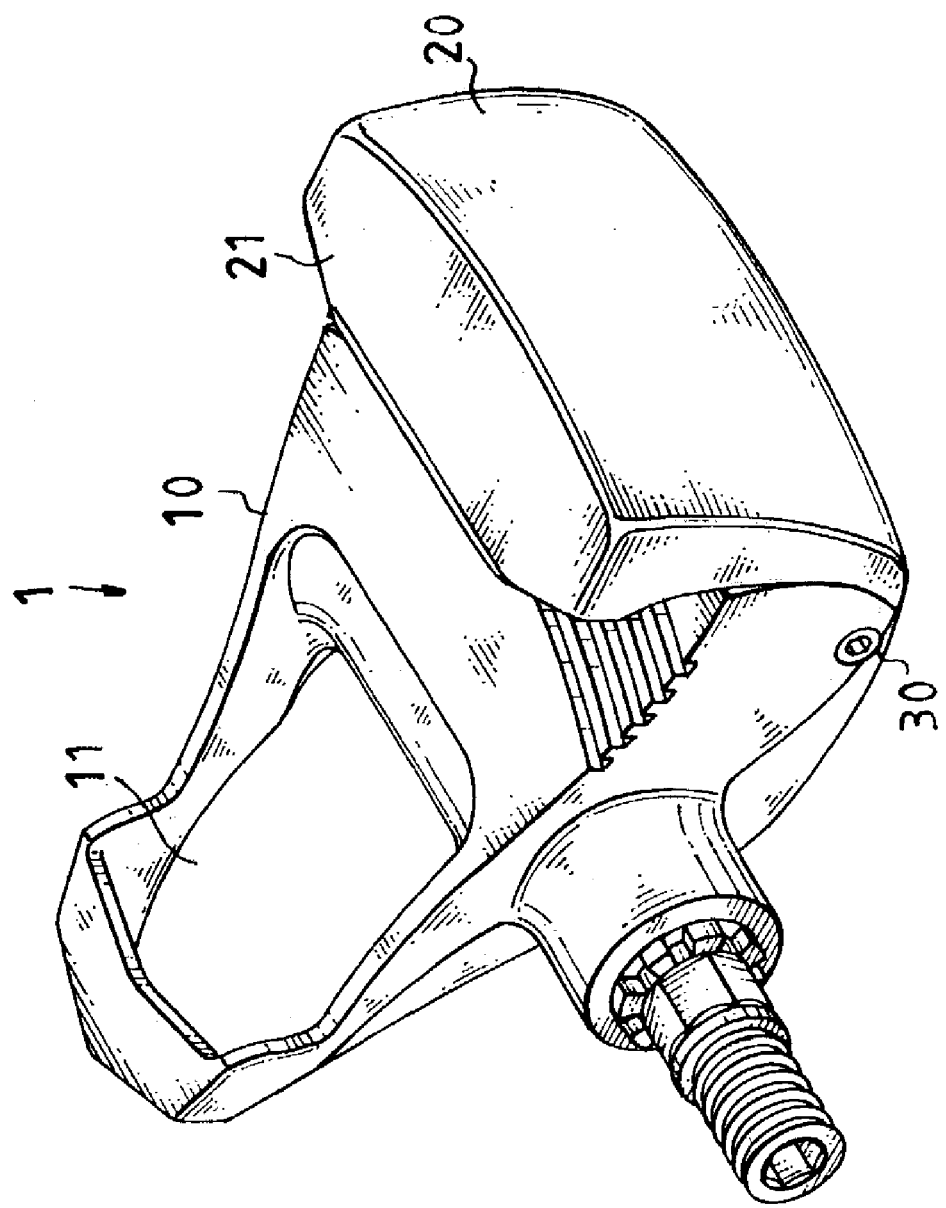
FIG. 4 is a perspective assembly view of a pedal device of a first preferred embodiment in accordance with the present invention.
Figure 5:
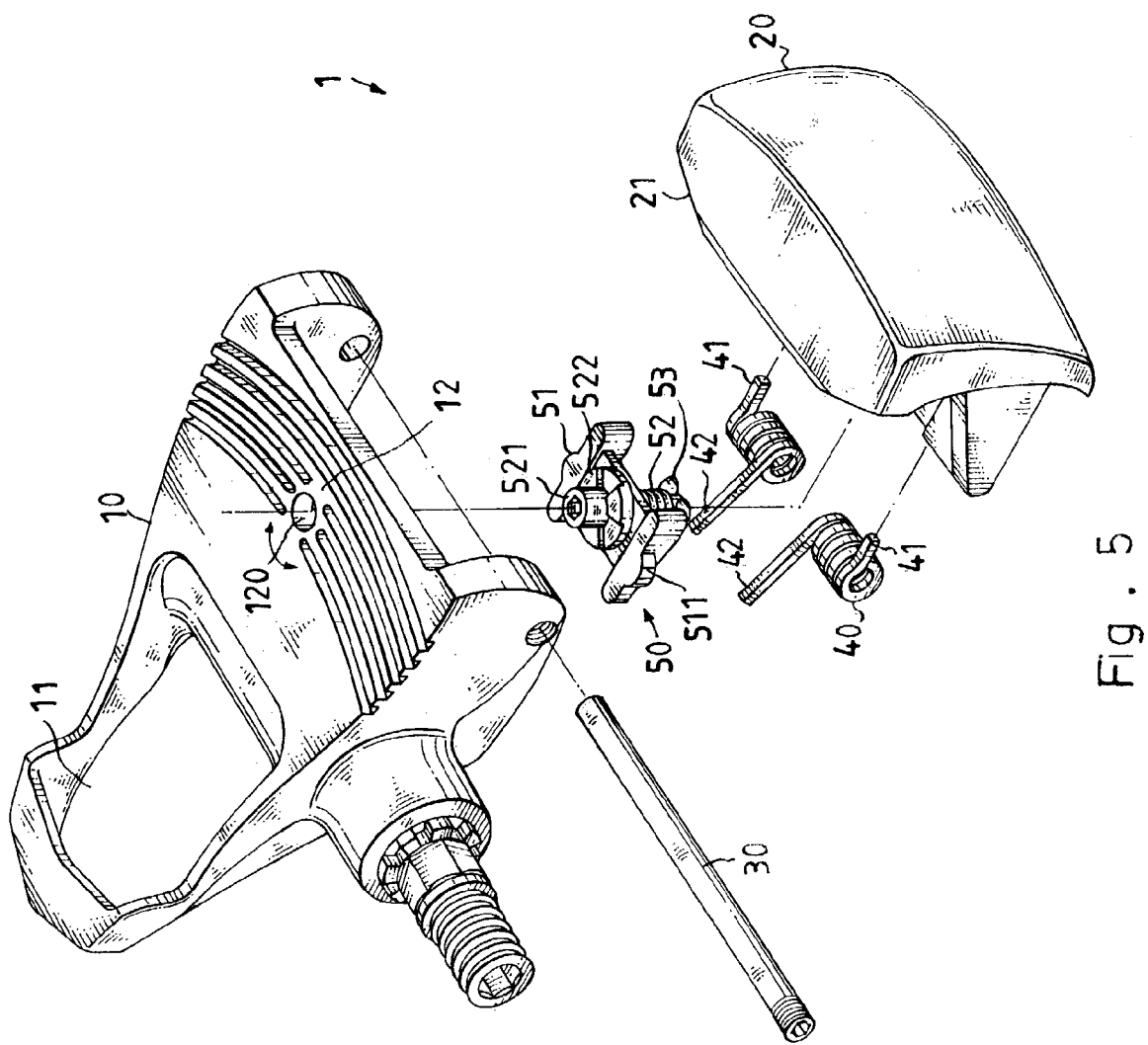
FIG. 5 is a perspective exploded view of a pedal device of a first preferred embodiment in accordance with the present invention.
Figure 6:
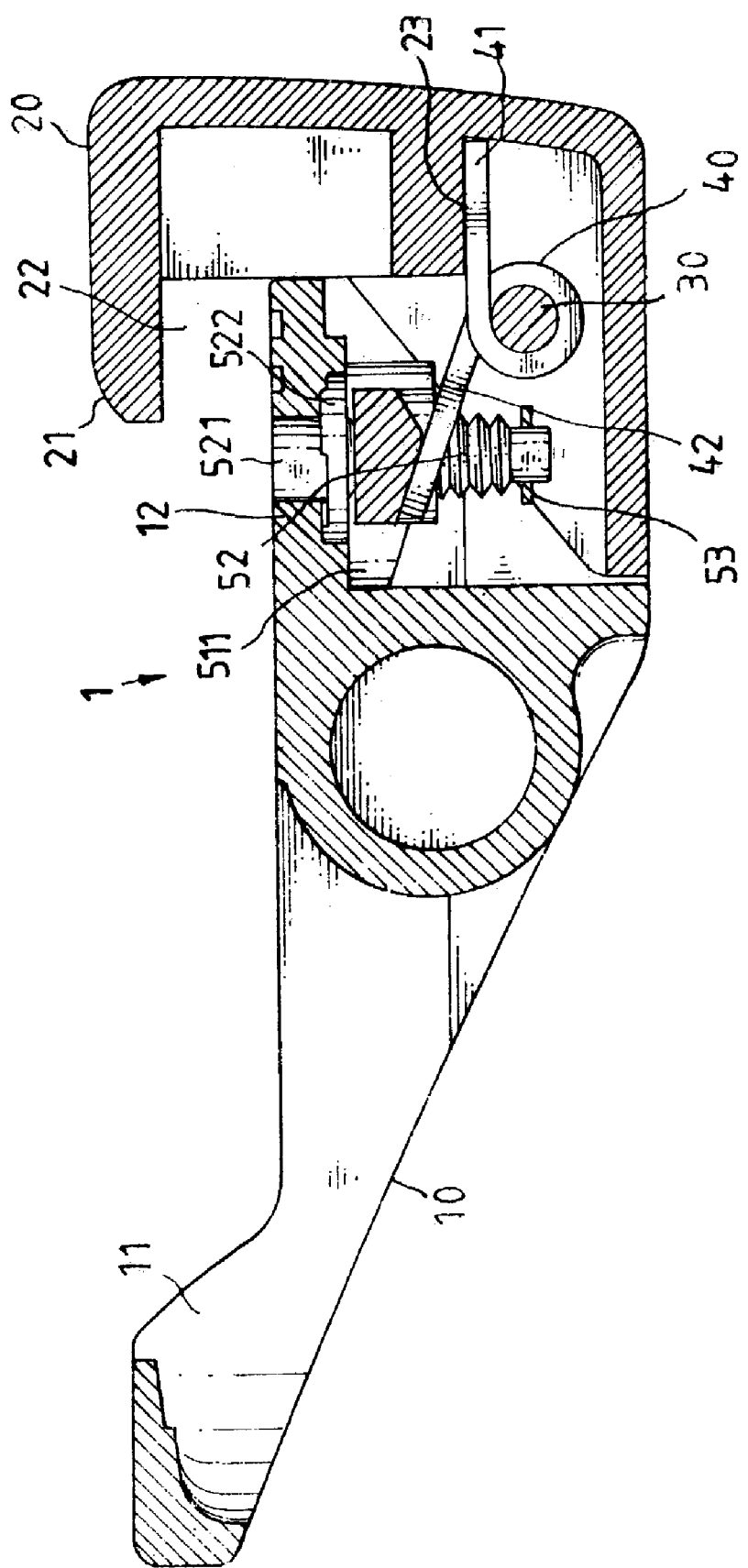
FIG. 6 is a sectional assembly view of a pedal device of a first preferred embodiment in accordance with the present invention.

Referring to FIGS. 4 to 6, a first pedal device 1 comprises a main body 10, a connection device 20, a pair of torsion springs 40, an adjustment seat 50, an adjustment stud 52, and a main shaft 30.

The connection device 20 has a chamber 22, an inner socket 23, and an upper hook portion 21.

The adjustment seat 50 has a cushion body 51, an adjustment stud 52 inserted through the cushion body 51, a hollow disk 522 enclosing the adjustment stud 52, and a retainer 53 enclosing an end of the adjustment stud 52 to prevent the adjustment stud 52 from being disengaged from the cushion body 51.

The adjustment stud 52 has a ring-shaped head 521.

The cushion body 51 has a pair of curved flanges 511.

The main body 10 has an opening 11 and a recessed panel 12 having a through aperture 120.

The adjustment seat 50 is disposed between the main body 10 and the connection device 20.

The torsion springs 40 are inserted in the inner socket 23 of the connection device 20.

Each of the torsion springs 40 has a first end 41 to block the inner socket 23 and a second end 42 to block the adjustment seat 50.

The main shaft 30 is inserted through the main body 10 and the torsion springs 40.

The ring-shaped head 521 of the adjustment stud 52 is inserted in the through aperture 120 of the recessed panel 12.

The connection device 20 engages with the main body 10.

Figure 17:
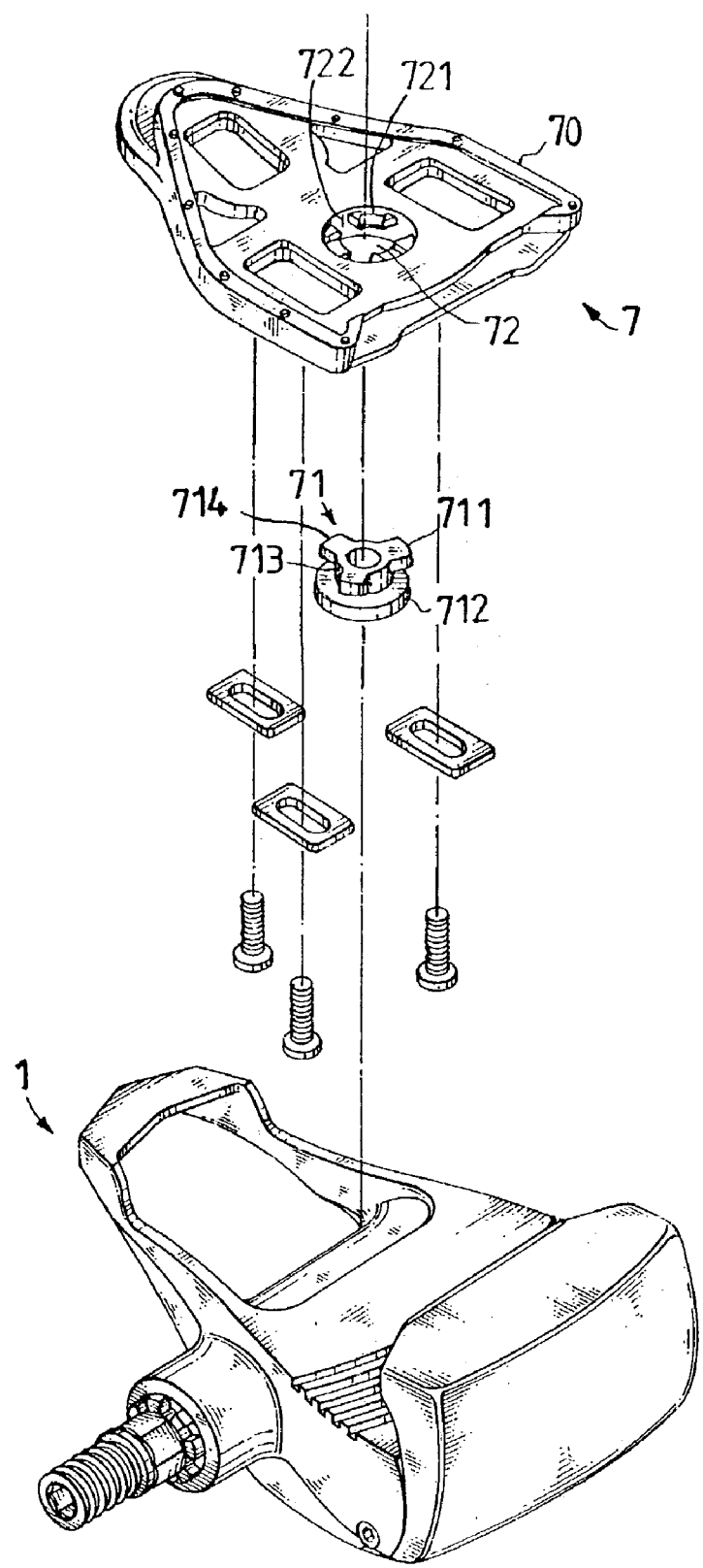
FIG. 17 is a perspective exploded view of an outsole clamp device, an antiskid device, and a pedal device of a first preferred embodiment in accordance with the present invention.
Figure 18:
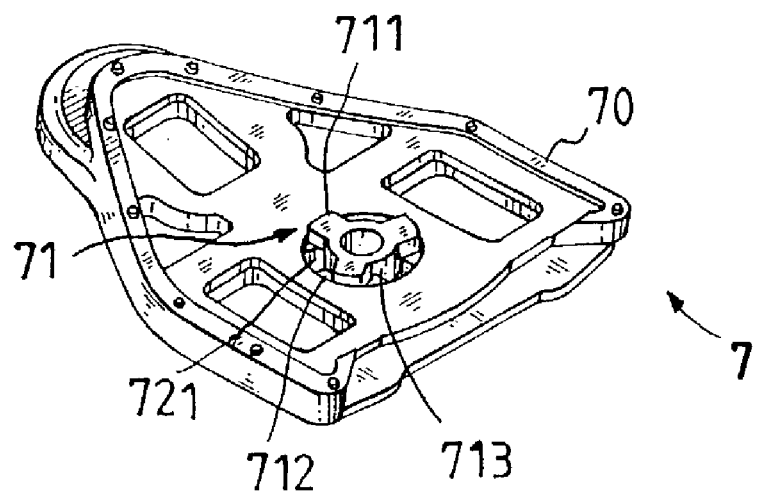
FIG. 18 is a perspective assembly view of an outsole clamp device and an antiskid device of a first preferred embodiment in accordance with the present invention.
Figure 19:
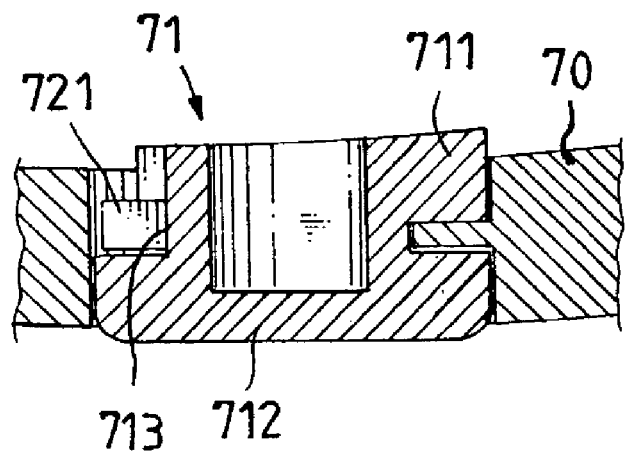
FIG. 19 is a sectional assembly view of an outsole clamp device and an antiskid device of a first preferred embodiment in accordance with the present invention.

Referring to FIGS. 17 to 19, an outsole clamp device 7 engages with the first pedal device 1.

The outsole clamp device 7 has a tongue-shaped body 70 having a round hole 72.

A plurality of inner protrusions 721 are formed in the round hole 72 of the outsole clamp device 7 to define a plurality of spacings 722.

An antiskid device 71 is inserted in the round hole 72 of the outsole clamp device 7.

The antiskid device 71 has a pawl device 711, a base ring 712 surrounding the pawl device 711, and an annular groove 713 defined between the pawl device 711 and the base ring 712.

The pawl device 711 engages with the inner protrusions 721.

The pawl device 711 has three claws 714.

The outsole clamp device 7 is disposed on a bottom of a runner shoe (not shown in the figures).

Figure 7:
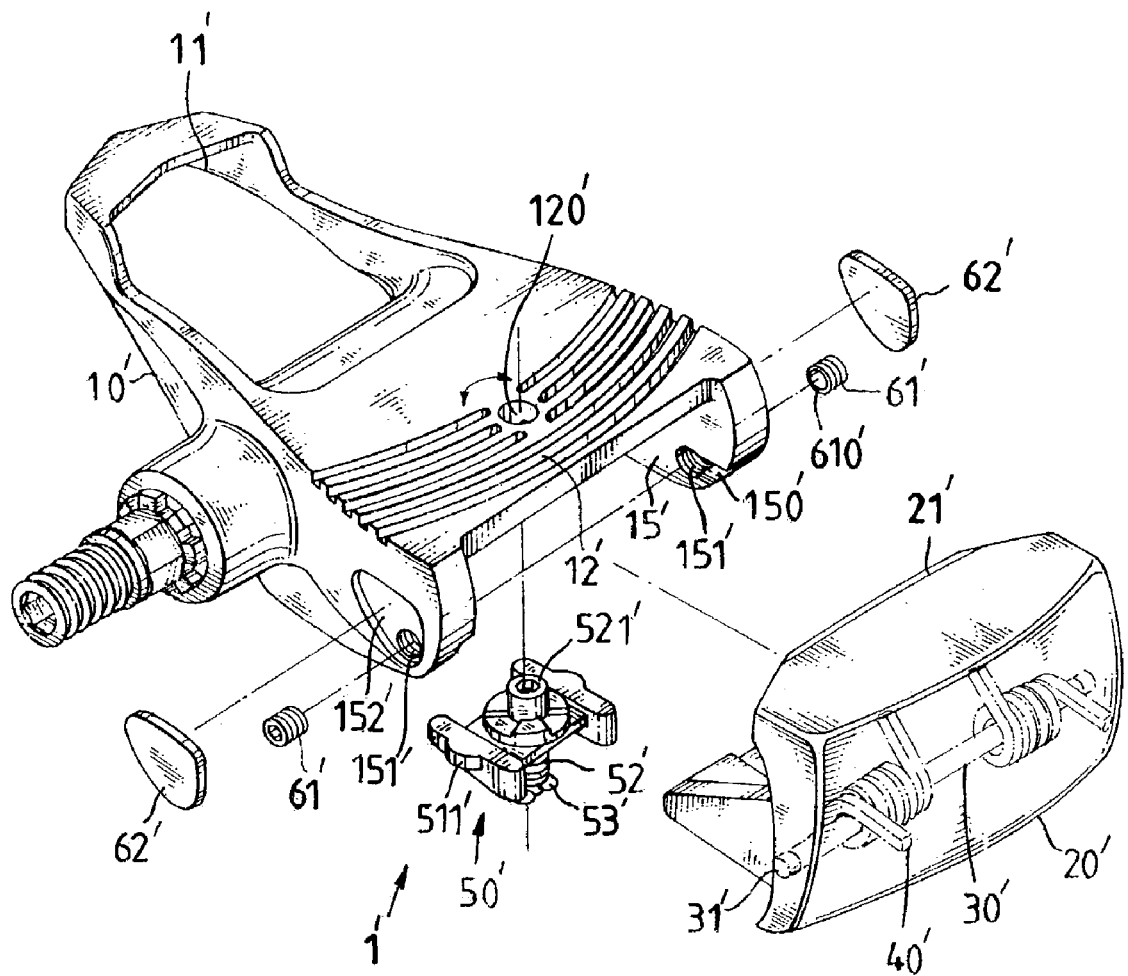
FIG. 7 is a perspective exploded view of a pedal device of a second preferred embodiment in accordance with the present invention.
Figure 8:
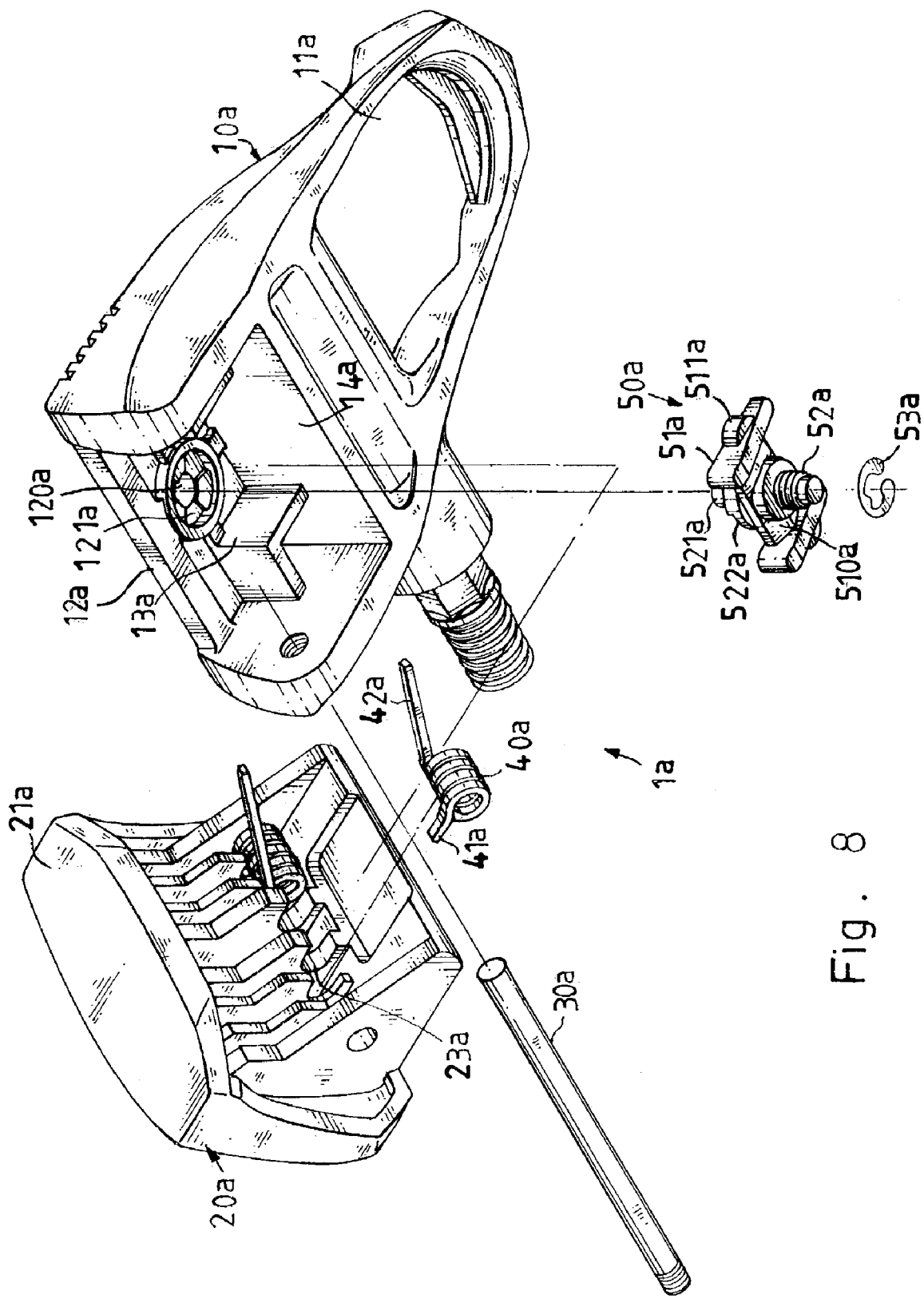
FIG. 8 is a perspective exploded view of a pedal device of a third preferred embodiment in accordance with the present invention.
Figure 9:
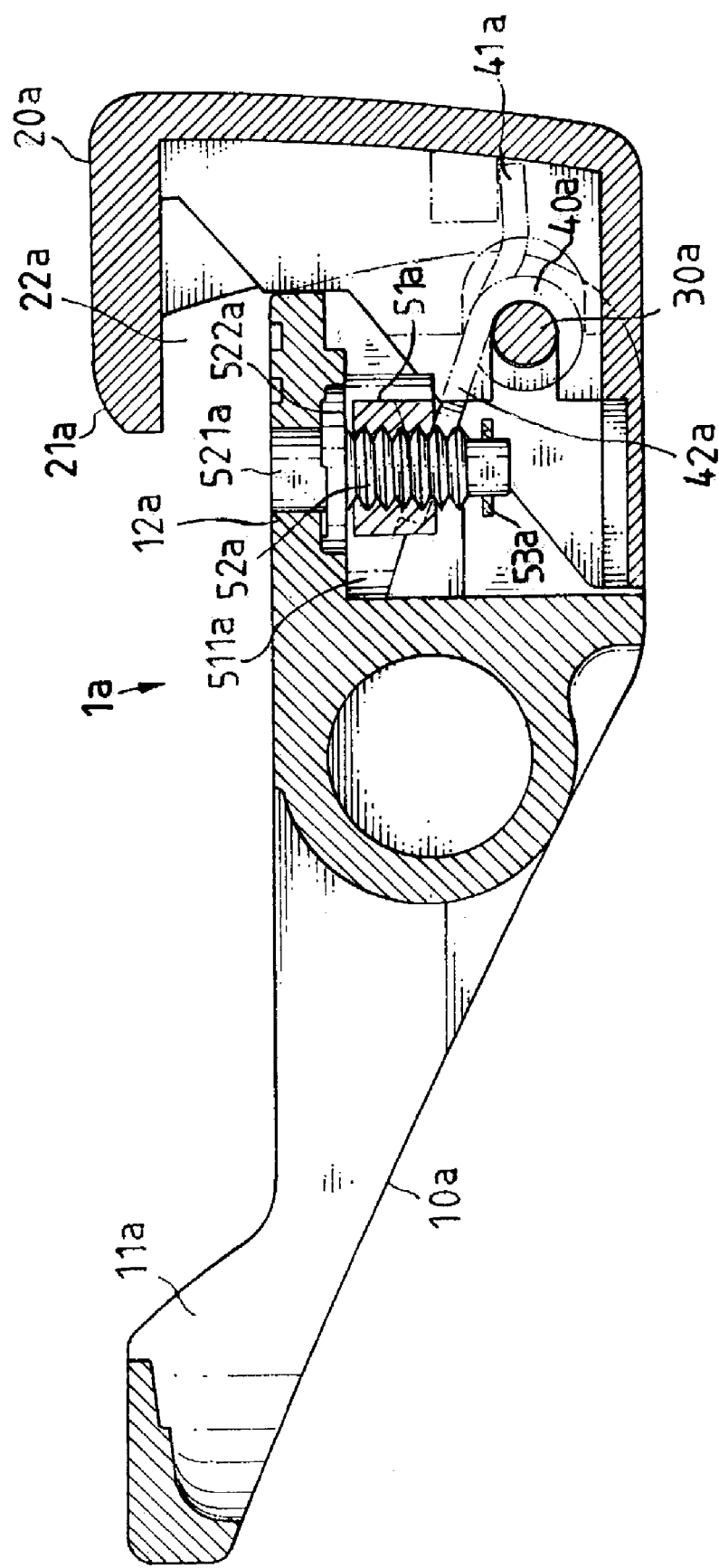
FIG. 9 is a sectional assembly view of a pedal device of a third preferred embodiment in accordance with the present invention.
Figure 12:
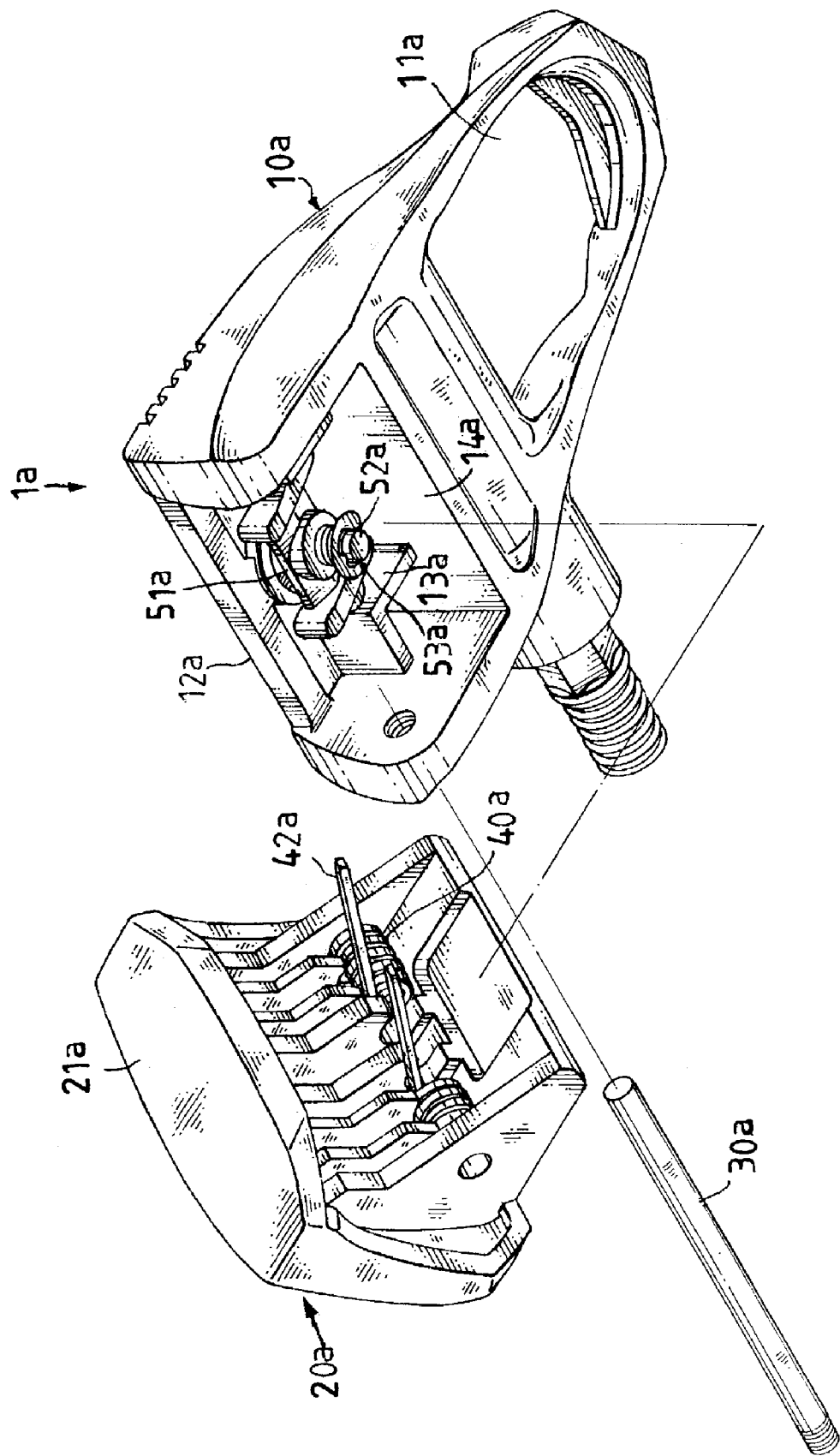
FIG. 12 is a perspective exploded view of a main body and a connection device of a third preferred embodiment in accordance with the present invention.

Referring to FIG. 7, a second pedal device 1' comprises a main body 10', a connection device 20', a pair of torsion springs 40', an adjustment seat 50', an adjustment stud 52', a main shaft 30', two threaded rings 61', and two cover plates 62'.

The connection device 20' has an upper hook portion 21'.

The adjustment seat 50' has a cushion body 51' and an adjustment stud 52' inserted through the cushion body 51', and a retainer 53' enclosing an end of the adjustment stud 52'.

The adjustment stud 52' has a ring-shaped head 521'.

The cushion body 51' has a pair of curved flanges 511'.

The main body 10' has an opening 11' and a recessed panel 12' having a through aperture 120'.

The torsion springs 40' are inserted in the connection device 20'.

The main shaft 30' has two end portions 31'.

The main shaft 30' is inserted through the torsion springs 40' and inserted in the connection device 20'.

The ring-shaped head 521' of the adjustment stud 52' is inserted in the through aperture 120' of the recessed panel 12'.

The main body 10' further has two lateral plates 15', two lateral recesses 152', two threaded apertures 151', two guide slots 150', and each of the threaded apertures 151' communicating with the corresponding guide slot 150'.

Each end portion 31' of the main shaft 30' is inserted in the corresponding guide slot 150' of the main body 10'.

Each threaded ring 61' is inserted in the corresponding threaded aperture 151' to be engaged with the corresponding end portion 31' of the main shaft 30'.

Each cover plate 62' is inserted in the corresponding lateral recess 152' of the main body 10'.

The connection device 20' engages with the main body 10'.

Referring to FIGS. 8 to 12, a third pedal device 1a comprises a main body 10a, a connection device 20a, a pair of torsion springs 40a, an adjustment seat 50a, an adjustment stud 52a, and a main shaft 30a.

The connection device 20a has a chamber 22a, an inner socket 23a, and an upper hook portion 21a.

The adjustment seat 50a has a cushion body 51a, an adjustment stud 52a inserted through the cushion body 51a, a hollow disk 522a enclosing the adjustment stud 52a, and a retainer 53a enclosing an end of the adjustment stud 52a.

The adjustment stud 52a has a ring-shaped head 521a.

The cushion body 51a has a pair of curved flanges 511a and a lower bevel 510a.

The main body 10a has an opening 11a, an inner wall 14a, and a recessed panel 12a having a through aperture 120a and a bottom groove 121a.

At least an L-shaped angle plate 13a is disposed on a bottom of the recessed panel 12a.

The torsion springs 40a are inserted in the inner socket 23a of the connection device 20a.

Each of the torsion springs 40a has a first end 41a to block the inner socket 23a and a second end 42a to block the lower bevel 510a of the cushion body 51a.

The ring-shaped head 521a of the adjustment stud 52a is inserted in the through aperture 120a of the recessed panel 12a.

The hollow disk 522a is inserted in the bottom groove 121a of the recessed panel 12a.

The connection device 20a engages with the main body 10a.

The main shaft 30a is inserted through the main body 10a and the torsion springs 40a.

The inner socket 23a of the connection device 20a has a notch 231a to receive the first end 41a of the corresponding torsion spring 40a.

The cushion body 51a is blocked by the L-shaped angle plate 13a and the inner wall 14a of the main body 10a.

Figure 13:
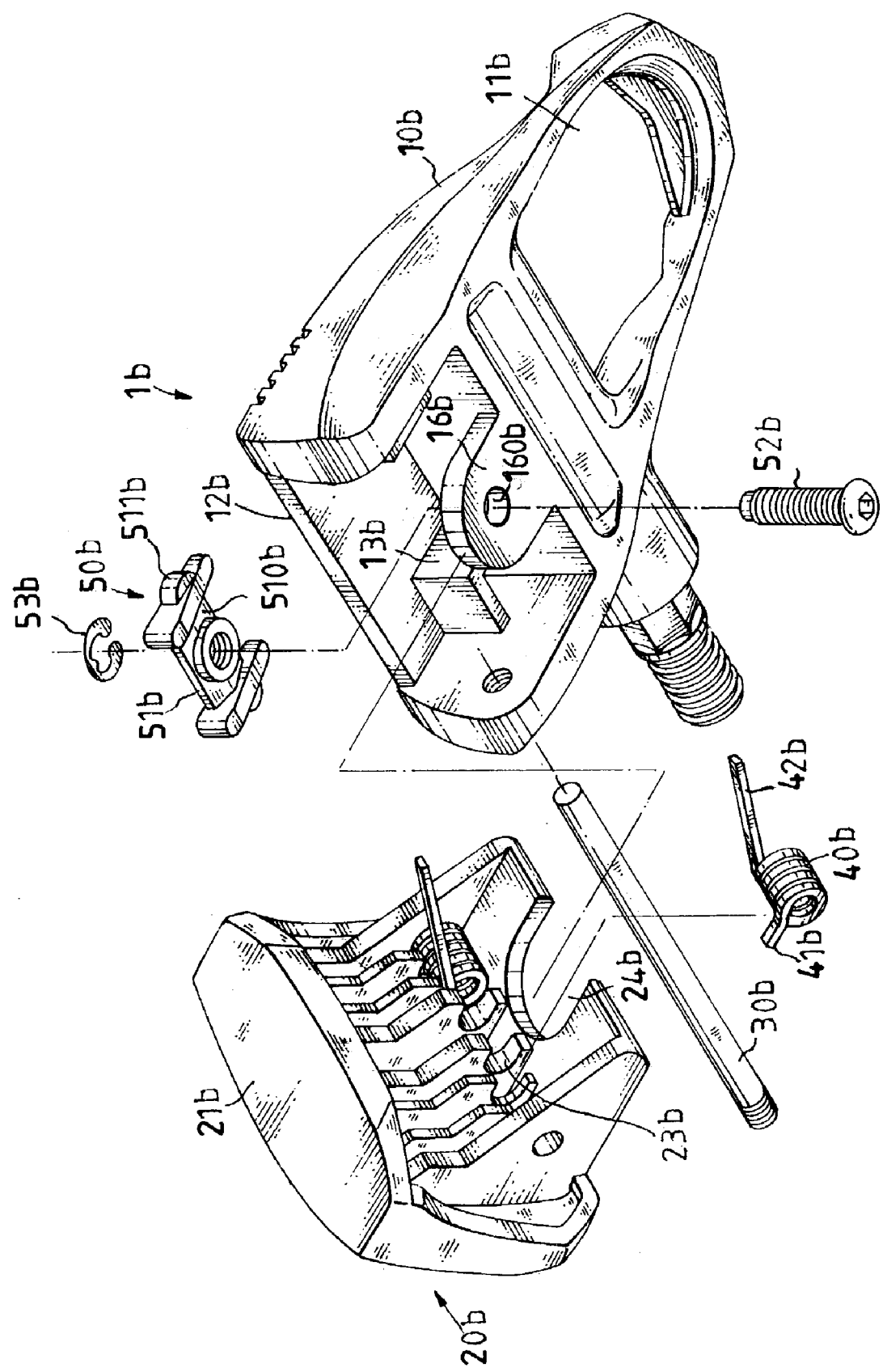
FIG. 13 is a perspective exploded view of a pedal device of a fourth preferred embodiment in accordance with the present invention.
Figure 14:
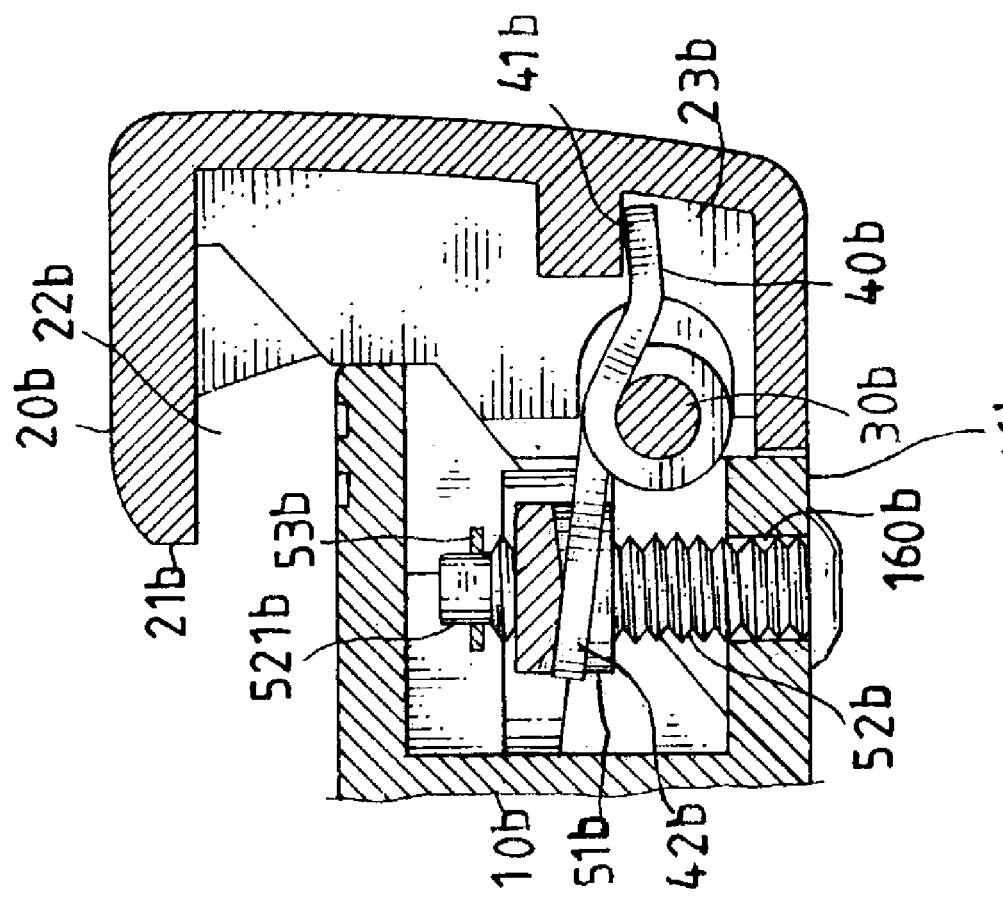
FIG. 14 is a partially sectional view of a pedal device of a fourth preferred embodiment in accordance with the present invention.

Referring to FIGS. 13 and 14, a fourth pedal device 1b comprises a main body 10b, a connection device 20b, a pair of torsion springs 40b, an adjustment seat 50b, an adjustment stud 52b, and a main shaft 30b.

The main body 10b has an opening 11b, an inner lug 16b having a circular hole 160b, and a recessed panel 12b.

The connection device 20b has a chamber 22b, an inner socket 23b, an upper hook portion 21b, and a semicircular groove 24b.

The adjustment seat 50b has a cushion body 51b disposed between the inner lug 16b and the recessed panel 12b, an adjustment bolt 52b inserted through the inner lug 16b and the cushion body 51b, and a retainer 53b enclosing an end of the adjustment bolt 52b.

The cushion body 51b has a pair of curved flanges 511b.

The torsion springs 40b are inserted in the inner socket 23b of the connection device 20b.

Each of the torsion springs 40b has a first end 41b to block the inner socket 23b and a second end 42b to block the cushion body 51b.

The connection device 20b engages with the main body 10b.

The main shaft 30b is inserted through the main body 10b and the torsion springs 40b.

An L-shaped angle plate 13b is disposed on a bottom of the recessed panel 12b.

The L-shaped angle plate 13b blocks the cushion body 51b.

The inner lug 16b is inserted in the semicircular groove 24b of the connection device 20b.

Figure 15:
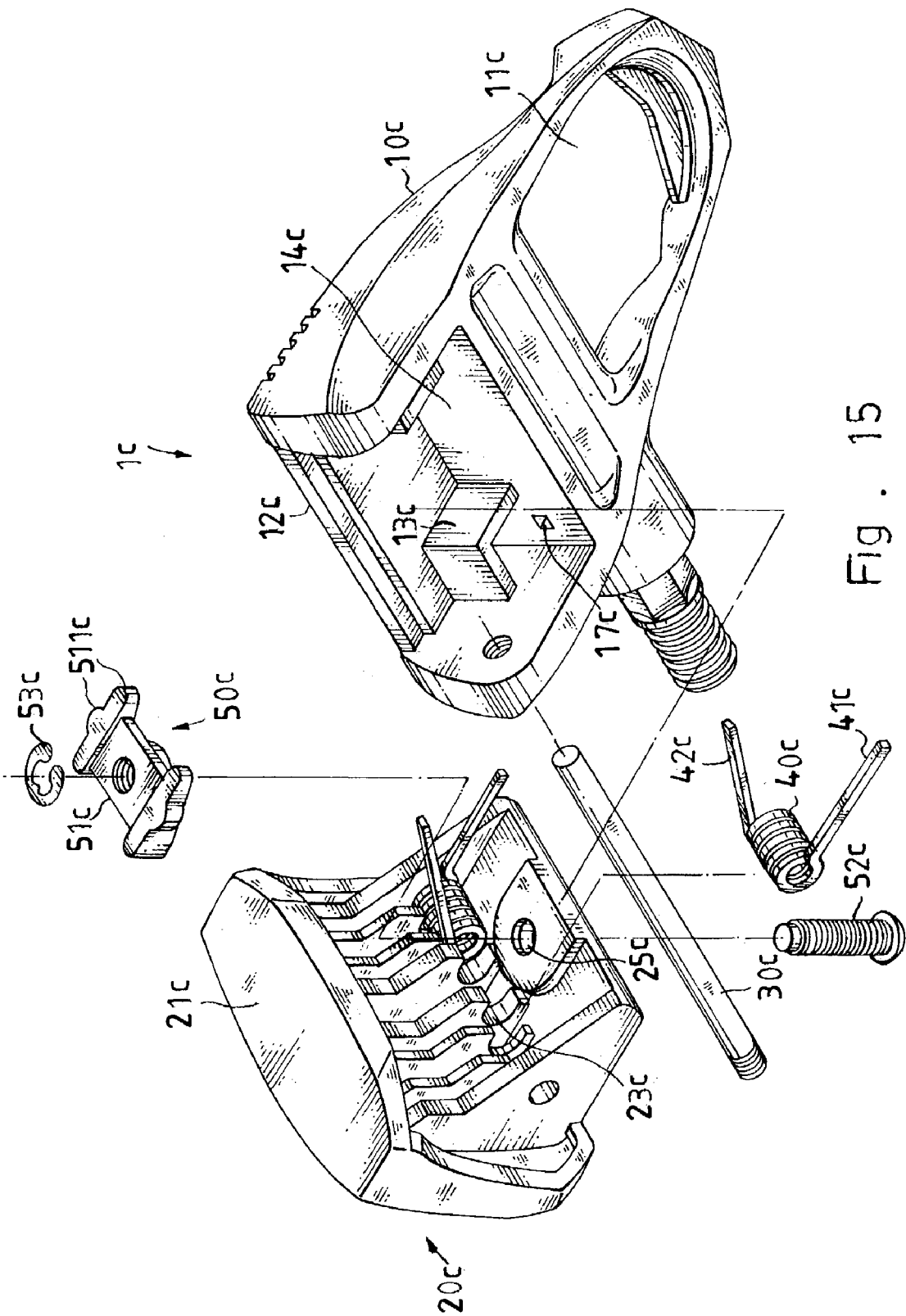
FIG. 15 is a perspective exploded view of a pedal device of a fifth preferred embodiment in accordance with the present invention.
Figure 16:
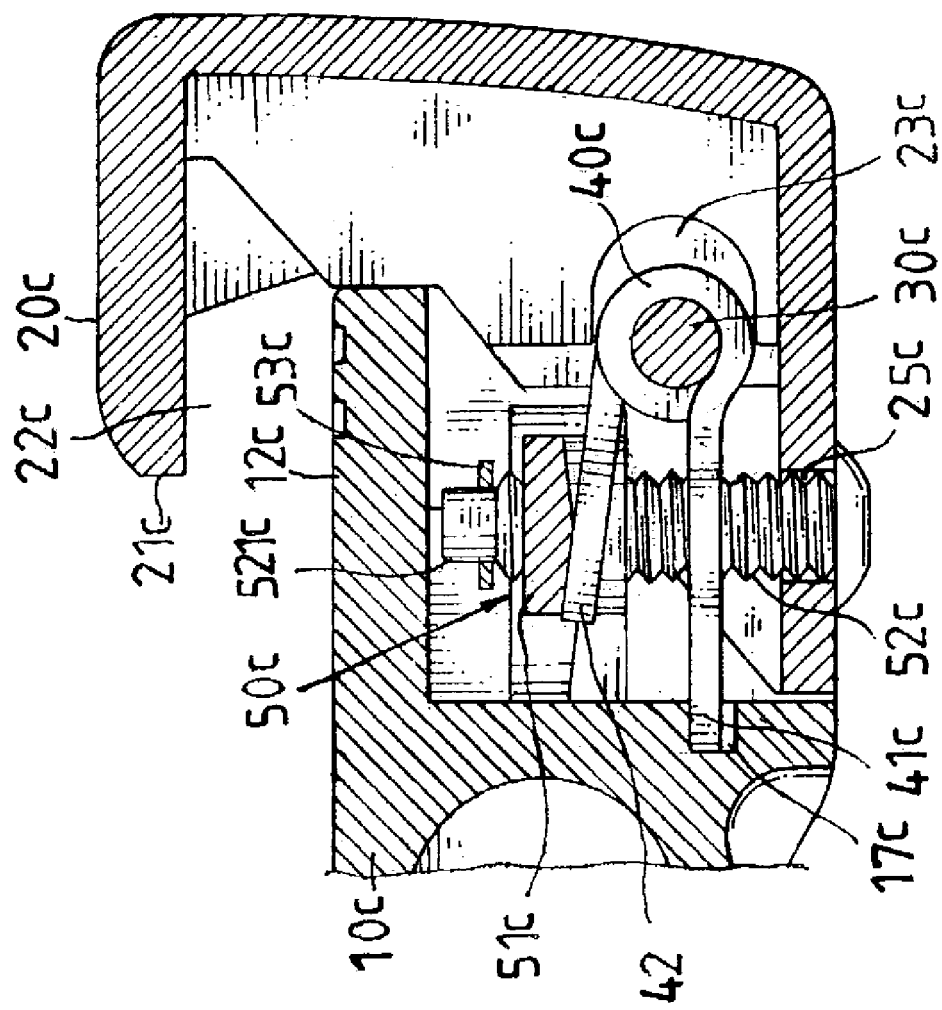
FIG. 16 is a partially sectional view of a pedal device of a fifth preferred embodiment in accordance with the present invention.

Referring to FIGS. 15 and 16, a fifth pedal device 1c comprises a main body 10c, a connection device 20c, a pair of torsion springs 40c, an adjustment seat 50c, an adjustment stud 52c, and a main shaft 30c.

The main body 10c has an opening 11c, a recessed panel 12c, an inner wall 14c, and at least an oblong hole 17c to receive one end of the corresponding torsion spring 40c.

The connection device 20c has a chamber 22c, an inner socket 23c, an upper hook portion 21c, and a circular hole 25c.

The adjustment seat 50c has a cushion body 51c disposed on the connection device 20c, an adjustment bolt 52c inserted through the connection device 20c and the cushion body 51c, and a retainer 53c enclosing an end 521c of the adjustment bolt 52c.

The cushion body 51c has a pair of curved flanges 511c.

The torsion springs 40c are inserted in the inner socket 23c of the connection device 20c.

Each of the torsion springs 40c has a first end 41c and a second end 42c to block the main body 10c.

The connection device 20c engages with the main body 10c.

The main shaft 30c is inserted through the main body 10c and the torsion springs 40c.

An L-shaped angle plate 13c is disposed on a bottom of the recessed panel 12c.

The L-shaped angle plate 13c blocks the cushion body 51c.

The present invention is not limited to the above embodiments but various modification thereof may be made. Furthermore, various changes in form and detail may be made without departing from the scope of the present invention.

I claim:

1. A pedal device comprises:
   a main body, a connection device, a pair of torsion springs, an adjustment seat, and a main shaft,
   the connection device having a chamber and an upper hook portion,
   the adjustment seat having a cushion body, and an adjustment stud inserted through the cushion body,
   the adjustment seat disposed between the main body and the connection device,
   the main body having an opening,
   the torsion springs inserted in the connection device,
   each of the torsion springs having a first end to block the connection device and a second end to block the adjustment seat,
   the main shaft inserted through the main body and the torsion springs, and
   the connection device engaged with the main body,
   wherein the main body further has a panel having a through aperture, two lateral plates, two threaded apertures, two guide slots, and each of the threaded apertures communicating with the corresponding guide slot.

2. The pedal device as claimed in claim 1, wherein the connection device has an inner socket to receive the torsion springs.

3. The pedal device as claimed in claim 1, wherein a retainer encloses an end of the adjustment stud.

4. The pedal device as claimed in claim 1, wherein a hollow disk encloses the adjustment stud.

5. The pedal device as claimed in claim 1, wherein at least an L-shaped angle plate is disposed on a bottom of the panel.

6. The pedal device as claimed in claim 1, wherein the main shaft has two end portions, and each said end portion of the main shaft is inserted in the corresponding guide slot of the main body.

7. The pedal device as claimed in claim 1, wherein the main body further has two lateral recesses, two cover plates, and each said cover plate is inserted in the corresponding later recess of the main body.

8. The pedal device as claimed in claim 2, wherein the inner socket has a notch to receive a first end of the corresponding torsion spring.

9. A pedal device comprises:
   a main body, a connection device, a pair of torsion springs, an adjustment seat, and a main shaft,
   the connection device having a chamber and an upper hook portion,
   the adjustment seat having a cushion body, and an adjustment stud inserted through the cushion body,
   the adjustment seat disposed between the main body and the connection device, the main body having an opening,
   the torsion springs inserted in the connection device,
   each of the torsion springs having a first end to block the connection device and a second end to block the adjustment seat,
   the main shaft inserted through the main body and the torsion springs, and
   the connection device engaged with the main body,
   wherein the main body further has a panel and an inner lug having a circular hole, the connection device further has an inner socket to receive the torsion springs and a semicircular groove to receive the inner lug, and the cushion body of the adjustment seat is disposed between the inner lug and the panel.

10. The pedal device as claimed in claim 9, wherein the inner lug has a circular hole.

11. The pedal device as claimed in claim 1, wherein the connection device further has a circular hole, and the cushion body of the adjustment seat is disposed on the connection device.

12. The pedal device as claimed in claim 1, wherein an outsole clamp device engages with the pedal device, the outsole clamp device has a tongue-shaped body having a round hole, a plurality of inner protrusions are formed in the round hole of the outsole clamp device to define a plurality of spacings, an antiskid device is inserted in the round hole of the outsole clamp device, the antiskid device has a pawl device and a base ring surrounding the pawl device, and the pawl device engages with the inner protrusions.

13. The pedal device as claimed in claim 12, wherein the pawl device has three claws.

* * * * *